June 3, 1952 E. A. McCORKELL 2,598,928

HOLDER FOR TELEPHONE HANDSETS

Filed Sept. 30, 1949

INVENTOR.
Ernest A. McCorkell,
BY
Davis, Lindsey, Hibben + Noyes
Attys.

Patented June 3, 1952

2,598,928

UNITED STATES PATENT OFFICE 2,598,928

HOLDER FOR TELEPHONE HANDSETS

Ernest A. McCorkell, Chicago, Ill.

Application September 30, 1949, Serial No. 118,792

6 Claims. (Cl. 179—156)

This invention relates to a device for supporting a telephone instrument in operating position upon the head of the user in such manner as to leave both hands of the user free for other purposes.

Telephone instruments which are now extensively used comprise a base or support, provided with a switching mechanism and frequently with a dialing mechanism, and a hand set receivable in the base. The hand set is usually of the combined transmitter and receiver type, commonly known as the French-type telephone, having an elongated handle grip or handle with the receiver mounted at one end and the transmitter at the opposite end thereof in such relation that when the receiver is held to the ear of the user the transmitter is positioned adjacent the user's mouth. In utilizing a telephone instrument of this character it is generally necessary for the user to employ one hand for holding the hand set in operating position adjacent to the head thus leaving only one hand free for writing or handling papers, books or other material which the user may desire to refer to during the telephone conversation. It will be apparent, therefore, that a satisfactory support or device for holding a hand set of this type in proper operating position without requiring the use of the hands would have important advantages in facilitating and simplifying the use of telephone instruments of the aforementioned character.

Various devices have been suggested heretofore for supporting a telephone hand set on the head of the user, but generally speaking these devices have been too complex and cumbersome in construction or too expensive to achieve widespread use and acceptance. Moreover, most of these proposed devices have made no satisfactory provision for readily detaching the hand set from the supporting device in the event that the user desires to hold the instrument in his hand in the conventional manner. In addition, certain of the proposed devices have failed to provide sufficiently rigid support for the hand set so that the instrument is properly positioned adjacent to the mouth and ear of the user while the head is held in a normal unstrained position.

Accordingly, a primary object of my invention is to provide a novel head support for a telephone instrument which is relatively simple in construction and operation and which overcomes the various disadvantages of the previously proposed devices of this character.

A further object of the invention is to provide a novel head support for a telephone hand set of the type described which is rigidly attachable to the handle portion of the hand set for gripping and retaining the same against twisting movement while the instrument is held in proper operating position.

An additional object of the invention is to provide a head support for a telephone hand set of the type described which is characterized by a novel two-piece construction whereby the parts of the device may be readily detached to permit the instrument to be held in the hand of the user, if desired.

Other objects and advantages of the invention will become apparent from the subsequent detailed description of the invention and the accompanying drawings in which.

Broadly speaking, my device comprises two parts, namely, a head-engaging member preferably in the form of a resilient band, and a separate clamping member adapted to be rigidly secured to the handle of a telephone hand set. The clamping member, with the telephone hand set rigidly secured therein, is detachably mountable on a cooperating portion of the head-engaging member so that the two parts of the device may be readily detached to permit conventional hand use of the telephone instrument, if desired.

Figure 1:
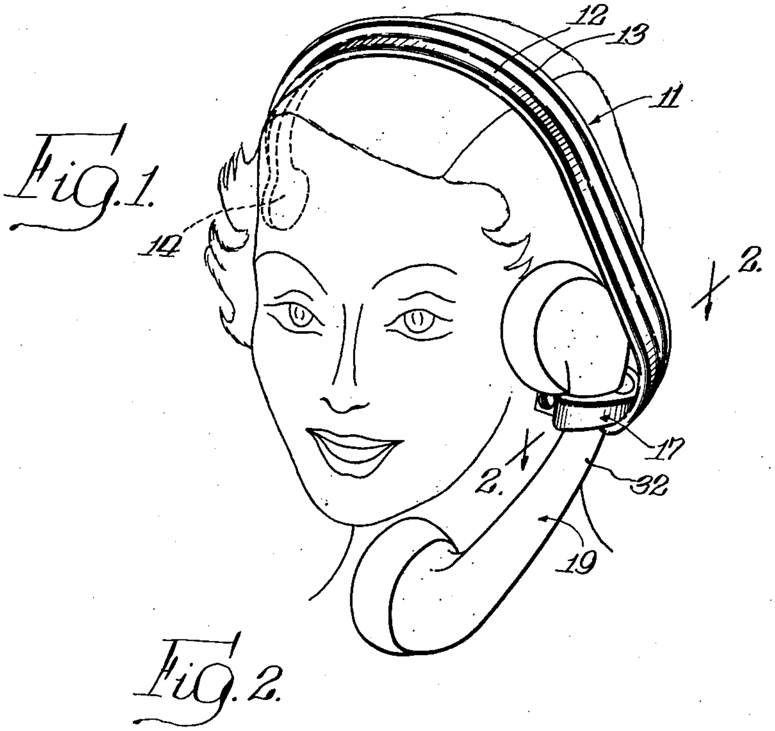
Fig. 1 is a perspective view illustrating a telephone head support comprising one specific embodiment of my invention and showing the device in operating position on the head of a user.
Figure 2:
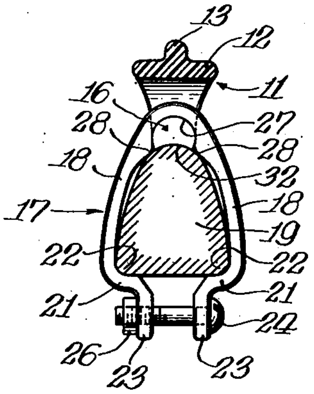
Fig. 2 is a transverse cross-sectional view of the device taken substantially along the line 2—2 of Fig. 1.
Figure 3:
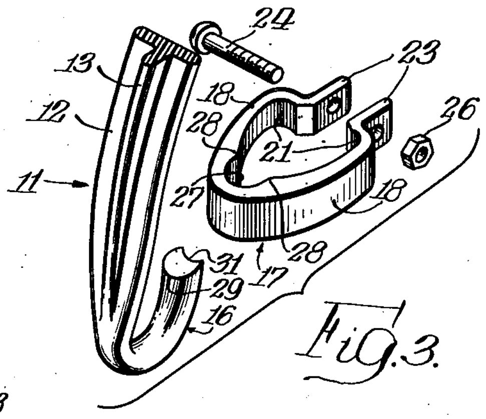
Fig. 3 is an exploded view of certain parts of the device.

Referring now to Figs. 1 to 3 of the drawing, the head-engaging member, indicated generally at 11, comprises a flat elongated one-piece band or strip 12 curved to fit over and embrace a user's head and provided with an integral centrally-located bead or strengthening and stiffening rib 13 over substantially its entire length. The head-engaging member 11 is formed preferably from a resilient material such as a suitable plastic so that the device may fit over and snugly grip the wearer's head. One end of the band 12 is enlarged to form a flattened gripping portion or pad 14 for engaging one side of the user's head, and the opposite end of the band 12 is adapted to be spread or extended outwardly in spaced relation with the opposite side of the user's head, as seen most clearly in Fig. 1, with an integral upturned hook portion, indicated generally at 16, being formed at the outermost extremity thereof.

The clamping member of my device, indicated generally at 17, comprises a U-shaped member having a pair of spaced side portions or arms 18 adapted to extend transversely around the shank or handle grip 19 of a French-type telephone hand set, the arms 18 being shaped to coact with the cross-sectional configuration of the handle 19 in order to prevent twisting of the handle 19 relative to the clamping member 17. To this end, the arms 18 are bent inwardly adjacent their outer ends to provide a pair of detents or notches 21 for snugly engaging and retaining the corner portions, indicated at 22, of the telephone handle adjacent the substantially flat inside face thereof. In the form of the device illustrated in Figs. 1 to 3, the arms 18 of the clamping member 17 are provided with outwardly extending end portions or lugs 23 which are clamped together by suitable retaining means, in this instance a screw 24 and a nut 26. Thus, the clamping member 17 is rigidly affixed on the elongated handle portion 19 of the telephone instrument and all twisting movement between the two is prevented as a result of the notched formations 21 of the arms 18 cooperating with the corners 22.

A curved aperture or opening 27 is provided adjacent to the base of the U-shaped clamping member 17 for slidably receiving the hook 16 at the supporting end of the head-engaging member 11. The arms 18 are formed with a pair of inwardly extending projections or abutments 28 disposed on opposite sides of the opening 27. Both the inner and outer surfaces of the hook 16 are curved, the inner surface of the hook being curved, as at 29 (Fig. 3), to fit the shape of the aperture 27 and the outer surface of the hook having a generally concave configuration, as at 31 (Fig. 3), in order to fit snugly against and conform to the shape of the outermost curved edge, indicated at 32, of the telephone handle 19. When the hook 16 is inserted through the opening 27 between the base of the clamping member 17 and the outer curved edge 32 of the telephone, it will be seen (Fig. 2) that the abutments 28 extend into engagement with the telephone handle 19 on either side of the point of contact of the latter with the concave outer surface 31 of the hook 16. Thus, when the clamping member 17 and the head-engaging member 11 are in assembled relation, the clamping member with the telephone handle rigidly secured therein fits snugly over the upturned hook 16 and all tendency toward undesirable twisting or displacement of the telephone from normal operating position is prevented as a result of the interlocking fit between the clamping member 17, the hook 16, and the handle 19 of the telephone set.

As a result of the sliding fit of the hook 16 within the aperture 27, it will be seen that the clamping member 17 is readily detachable from the head-engaging member 11 thereby permitting the user to remove the telephone instrument from the head band at any time and use the instrument in the conventional manner. The angular relationship of the hook 16 with respect to the head-engaging member 11 and the clamping member 17 is such that the mouthpiece of the telephone instrument is located adjacent to the mouth of the wearer and the ear piece is held against the wearer's ear, as clearly seen in Fig. 1. Moreover, when the device is in assembled condition the telephone instrument is so balanced with respect to the supporting device that the weight of the instrument tends to hold the head-engaging member on the wearer's head.

Figure 4:
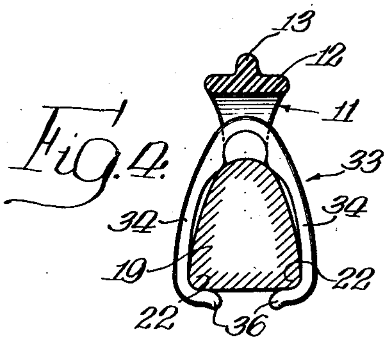
Fig. 4 is a cross-sectional view similar to Fig. 2 but showing a slight modification of one part of the device.

In Fig. 4 of the drawing there is shown a modified form of the clamping member 17 in which the retaining means comprising the screw 24 and the nut 26 have been eliminated. In this form of the device, the clamping member comprises a U-shaped part, indicated generally at 33, having a pair of spaced resilient arms 34 adapted to extend transversely around the sides of the shank portion 19 of the telephone hand set. The outer ends of the arms 32 are bent inwardly toward each other, as at 36, to grip the inner corners 22 of the telephone handle 19. In this form of the device the resilient pressure between the arms 34 having the bent ends 36 is sufficient to rigidly retain the telephone hand set in clamped non-twisting relation therein.

Although the invention has been illustrated and described in connection with certain specific structural embodiments, it will be understood that various modifications and alternative structures may be resorted to without departing from the scope of the invention as defined in the appended claims.

I claim:

1. A telephone instrument support comprising a head-engaging member adapted to fit on a user's head, a supporting hook on said head-engaging member adapted to be disposed in proximity to the user's ear when the head-engaging member is in position on the user's head, and a clamping member rigidly engageable with the handle portion of a telephone hand set, said clamping member having aperture means for removably receiving said hook whereby said clamping member and the telephone hand set secured thereto may be detachably supported on said head-engaging member.

2. A telephone instrument support comprising an elongated resilient head band curved to embrace and grip a user's head and having an integral upturned hook portion at one end thereof, and a clamping member rigidly attachable to the elongated handle portion of a telephone hand set, said clamping member having aperture means therethrough adapted to slidably receive and coact with the hook portion of said head band for rigidly and detachably holding the telephone instrument in operating position on the head of the user.

3. A telephone instrument support comprising a head-engaging member adapted to fit on a user's head and having a supporting hook at one side thereof, and a U-shaped clamping member having aperture means adjacent the base thereof for cooperating with said hook and having spaced arms adapted to extend transversely around the handle portion of a telephone hand set for rigidly securing the same, said arms being adapted to coact with the cross-sectional configuration of said handle portion to prevent twisting movement of the latter relative to said clamping member, and said hook being slidably receivable within said aperture means for detachably holding the telephone instrument in operating position.

4. A telephone instrument support comprising a head-engaging member adapted to fit on a user's head, and having an upturned hook at one side thereof, and a clamping member rigidly attachable to the elongated handle portion of a telephone hand set, said clamping member having an aperture therethrough for slidably receiving said hook, and said hook having curved inner and outer surfaces operatively engageable with the inner surface of said aperture and with the outer curved edge of said handle portion for rigidly holding the telephone instrument in operating position on the user's head but permitting rapid detachment of the clamping member, and the telephone instrument secured thereto, from said head-engaging member when desired.

5. A telephone instrument support comprising a head-engaging member adapted to fit on a user's head and having an upturned hook on one side thereof, and a U-shaped clamping member having an aperture adjacent the base thereof and having a pair of spaced arms adapted to extend transversely around the sides of the elongated handle portion of a telephone hand set for gripping and rigidly securing the latter, said hook being slidably receivable within said aperture for detachably mounting said clamping member on said head-engaging member, and said hook having a curved inner surface conforming to the shape of said aperture and having a concave outer surface adapted to abut and coact with the curved outer edge of said handle portion for rigidly holding the telephone instrument in operating position on the head of the user but permitting rapid detachment of the clamping member, and the telephone instrument secured thereto, from said head-engaging member when desired.

6. A telephone instrument support comprising a head-engaging member adapted to fit on a user's head and having an upturned hook on one side thereof, and a U-shaped clamping member having a pair of spaced arms adapted to extend transversely around the sides of the elongated handle portion of a telephone hand set for gripping and rigidly securing the latter, said hook being slidably insertable through said clamping member between the base thereof and said handle portion clamped therein, and said hook having curved inner and outer surfaces engageable with the base of said clamping member and with the outer curved edge of said handle portion for rigidly retaining the telephone instrument in operating position on the head of a user but permitting rapid detachment of the clamping member, and the telephone instrument secured thereto, from said head-engaging member when desired.

ERNEST A. McCORKELL.

REFERENCES CITED

The following references are of record in the file of this patent:

UNITED STATES PATENTS

| Number | Name | Date |
|---|---|---|
| 1,560,718 | Nowosielski | Nov. 10, 1925 |
| 1,959,572 | Craig | May 22, 1934 |
| 2,020,084 | Sidders | Nov. 5, 1935 |
| 2,360,027 | Wermer | Oct. 10, 1944 |
| 2,460,458 | Kobrin | Feb. 1, 1949 |